United States Patent [19]

Schroeder

[11] Patent Number: 5,236,722
[45] Date of Patent: Aug. 17, 1993

[54] COMPOSITION AND METHOD OF PRODUCTION OF A BEVERAGE FOR HUMAN CONSUMPTION

[76] Inventor: Bernard F. Schroeder, 2100 Ocean Dr., S. #3B, Jacksonville Beach, Fla. 32250

[21] Appl. No.: 973,066

[22] Filed: Nov. 6, 1992

[51] Int. Cl.$^5$ ................................................. A23L 2/00
[52] U.S. Cl. ..................................... 426/67; 426/474; 426/590
[58] Field of Search ................. 426/67, 324, 330, 474, 426/590

[56] References Cited

U.S. PATENT DOCUMENTS

| | | | |
|---|---|---|---|
| 700,464 | 5/1902 | Weyl | 426/67 |
| 4,027,045 | 5/1977 | Fedotkin et al. | 426/590 |
| 5,006,352 | 4/1991 | Zelanak nee Zoltai et al. | 426/67 |

OTHER PUBLICATIONS

Woodroof et al, Beverages: Carbonated And Noncarbonated published by the AVI Publishing Company, Inc., 1974 (pp. 110–115).

Primary Examiner—George Yeung
Attorney, Agent, or Firm—Thomas C. Saitta

[57] ABSTRACT

A process for the manufacture of a beverage for human consumption having beneficial effects relating to countering the effects of oxygen depletion in the human body, and the beverage produced by the process, which includes the steps of conditioning potable water to remove hardness, filtering the water to remove inorganic and organic matter, ozonating the water to purify it and to increase the level of dissolved oxygen in the water to at least 6 mg/l, adding potassium gluconate and immediately sealing within a container.

18 Claims, No Drawings

COMPOSITION AND METHOD OF PRODUCTION OF A BEVERAGE FOR HUMAN CONSUMPTION

BACKGROUND OF THE INVENTION

The invention relates to a process for the manufacture, and the resulting composition from this process, of a beverage for human consumption having beneficial effects to the human system, the process involving purification treatment steps for water, ozonation to increase the amount of dissolved oxygen in the water, and the addition of potassium gluconate.

It is known to researchers that exercise, stress, fatigue and other human conditions are characterized by depletion of oxygen within the bloodstream. Certain processes and compositions have been developed to produce means to rapidly replenish this oxygen, often centering on the production of a water-based beverage composition having a higher than normal content of dissolved or dispersed oxygen. For example, Fedotkin et al. in U.S. Pat. No. 4,027,045 teaches an oxygenated cocktail created by introducing oxygen into a foam making material. Zelenak nee Zoltai et al. in U.S. Pat. No. 5,006,352 teaches an oxygenated restorative drink produced by infusing water with oxygen at low temperature and under pressure.

It has been found that particular process steps produce a beverage having improved properties, with the major emphasis being placed on the use of ozone at room temperature to produce high levels of dissolved oxygen in the water. These treatment steps, coupled with the addition of a source of potassium ions, produce a novel beverage having beneficial properties for human consumption related to countering the effects of oxygen depletion.

SUMMARY OF THE INVENTION

The invention is a process for manufacturing a beverage for human consumption, and the resulting beverage manufactured by this process, where the beverage contains a high level of dissolved oxygen and a source of potassium ions. In general, the process comprises the steps of conditioning potable water in a water softener to reduce hardness, passing the water through reverse osmosis filtering means to remove organic and inorganic matter, ozonating the water to sterilize it, the ozonation being performed in a manner which simultaneously increases the level of dissolved oxygen in the water to at least 6 mg/l, adding potassium gluconate as a source of potassium ions, and bottling immediately to prevent oxygen loss.

DETAILED DESCRIPTION OF THE INVENTION

The process of the invention produces a beverage for human consumption which has improved beneficial effects related to countering the effects of oxygen depletion in the body. The beverage produced is a purified water high in dissolved oxygen and containing an amount of potassium gluconate.

The source water should be potable water, preferably obtained from a municipal system utilizing known treatment techniques for improving the water quality. Water from wells or other natural sources may be used, but mineral waters, carbonated waters or the like are not suitable due to the presence of the added components. The water is passed through a water softener of the cation resin/ion exchange type to reduce the hardness of the water by removing any calcium and magnesium from the water. The process must produce a water having a hardness measurement of less than 2 grains.

The conditioned or softened water is then passed through a reverse osmosis filtering system. This step must remove at least 95 percent of the inorganic and organic matter, or in other words, the total dissolved solids should be less than 5 percent of the original total dissolved solids in the source water.

The water is then ozonated by exposing the water to a supply of ozone gas. The ozone may be produced by any known method, such as a corona discharge ozonator supplied by ambient air, dried air or bottled oxygen gas. Dehumidifying or using relatively pure oxygen as the air source increases the ozone output of the ozonator. The ozonation step is accomplished with forced injection means, such as a Mazzi injector, a pump, or by use of a mixing venturi. The ozonation purifies the water by oxidation, killing any bacteria or viruses present. The ozonation process as performed above also increases the amount of dissolved oxygen present in the water. The ozonation means must produce a residual amount of dissolved oxygen in the water of at least 6 mg/l. It is possible to achieve residual amounts as great as 40 mg/l, but the beneficial effects of the product are obtained with values near the 6 mg/l, value so the additional dissolved oxygen is not necessary. Use of ozone as opposed to molecular oxygen to increase the dissolved oxygen content of the water makes this processing step much more easily accomplished. The ozonation step can be performed at room temperature and still attain the desired minimum dissolved oxygen amounts.

To the ozonated water is added a source of potassium ions, preferably potassium gluconate ($C_6H_{11}O_7K$), preferably in the amount of approximately 30 mg per 8 ounces of water. Potassium gluconate is a known beverage additive, and is the potassium salt of d-gluconic acid produced from glucose by fermentation. Solutions of potassium gluconate resist both oxidation and reduction, and are used as buffers. The composition is used as a means of introducing or enriching potassium, is a systemic alkalizer and an intermediary of metabolism, possesses a good diuretic effect and promotes certain gland secretions. It is beneficial in the treatment of asthmatic and allergic disease, diarrhea, menstrual syndrome and hypokalemic alkalosis.

The purified water and potassium gluconate composition is then immediately bottled and sealed in a container to prevent loss of the excess dissolved oxygen. It is also preferable that all processing steps utilize non-ferrous materials, preferably plastics, for conduits and the like, to prevent the introduction of unwanted metal contaminates to the water.

It is to be understood that one skilled in the art may be aware of obvious substitutions and equivalents for the above described invention. The full scope and definition of the invention therefore is to be as set forth in the following claims.

I claim:

1. A process for the manufacture of a beverage for human consumption having beneficial effects related to oxygen depletion, the process including the steps of providing a potable source water, conditioning said water to reduce the hardness of said water, filtering said water through a reverse osmosis filtering means to remove inorganic and organic matter, ozonating said water to purify said water and to increase the level of dissolved oxygen in said water to at least 6 mg/l, adding a source of potassium ions to said water, and immediately bottling and sealing said water in a container.

2. The process of claim 1, where said step of conditioning said water reduces said hardness of said water to less than 2 grains.

3. The process of claim 2, where said step of conditioning said water is performed in a cation resin/ion exchange water softener.

4. The process of claim 1, where said step of filtering said water removes at least 95 percent of said organic and inorganic matter from said water.

5. The process of claim 1, where said step of ozonating said water utilizes a corona discharge ozonator.

6. The process of claim 1, where said step of ozonating said water utilizes a Mazzi injector.

7. The process of claim 1, where said step of ozonating said water utilizes a venturi.

8. The process of claim 1, where said source of potassium ions is potassium gluconate.

9. The process of claim 8, where approximately 30 mg of potassium gluconate is added per 8 ounces of said water.

10. A beverage for human consumption having beneficial effects relating to oxygen depletion, produced by the process including the steps of providing a potable source water, conditioning said water to reduce the hardness of said water, filtering said water through a reverse osmosis filtering means to remove inorganic and organic matter, ozonating said water to purify said water and to increase the level of dissolved oxygen in said water to at least 6 mg/l, adding a source of potassium ions to said water, and immediately bottling and sealing said water in a container.

11. The beverage of claim 10, where said step of conditioning said water reduces said hardness of said water to less than 2 grains.

12. The beverage of claim 11, where said step of conditioning said water is performed in a cation resin/ion exchange water softener.

13. The beverage of claim 10, where said step of filtering said water removes at least 95 percent of said organic and inorganic matter from said water.

14. The beverage of claim 10, where said step of ozonating said water utilizes a corona discharge ozonator.

15. The beverage of claim 10, where said step of ozonating said water utilizes a Mazzi injector.

16. The beverage of claim 10, where said step of ozonating said water utilizes a venturi.

17. The beverage of claim 10, where said source of potassium ions is potassium gluconate.

18. The beverage of claim 17, where approximately 30 mg of potassium gluconate is added per 8 ounces of said water.

* * * * *